Sept. 16, 1952  D. J. PARMESAN  2,610,870
UNION HAVING PRESSURE RESPONSIVE SEAL
Filed July 12, 1948

INVENTOR.
Daniel J. Parmesan
BY
E. V. Hardway
ATTORNEY

Patented Sept. 16, 1952

2,610,870

UNITED STATES PATENT OFFICE 2,610,870

UNION HAVING PRESSURE RESPONSIVE SEAL

Daniel J. Parmesan, Houston, Tex., assignor, by mesne assignments, to Chiksan Company, Brea, Calif., a corporation of California Application July 12, 1948, Serial No. 38,250

3 Claims. (Cl. 285—122)

This invention relates to a union having pressure responsive seal.

An object of the invention is to provide a union whereby sections of pipe or tubing may be quickly connected or disconnected with a novel type of seal for preventing leakage of the fluid through the union.

It is another object of the invention to provide a union of the character described whereby a fluidtight seal will be formed even though the connected sections may not be in perfect axial alignment.

A further object of the invention is to provide, in a union, a gasket, or seal ring, formed of yieldable material and whose end faces which contact with the opposing end faces of the coupling members are provided with concentric spaced grooves forming annular ribs between the grooves which improve the sealing effect of the gasket.

It is a further object of the invention is to provide, in a union of the character described, a novel type of gasket which effectively breaks, or covers, the joint between the members, the gasket being of such formation that the fluid flowing through the line will not displace the gasket but the pressure of the fluid will tend to hold the gasket more firmly seated in an internal annular seat provided to receive it.

Other objects and advantages will be apparent from the following specification which is illustrated by the accompanying drawings, wherein.

Referring now more particularly to the drawings wherein like numerals of reference designate the same parts in each of the figures, the numerals 1 and 2 designate, respectively, the coupling members of the union whose outer ends are internally threaded for the connection sections of pipe thereto.

Figure 1:
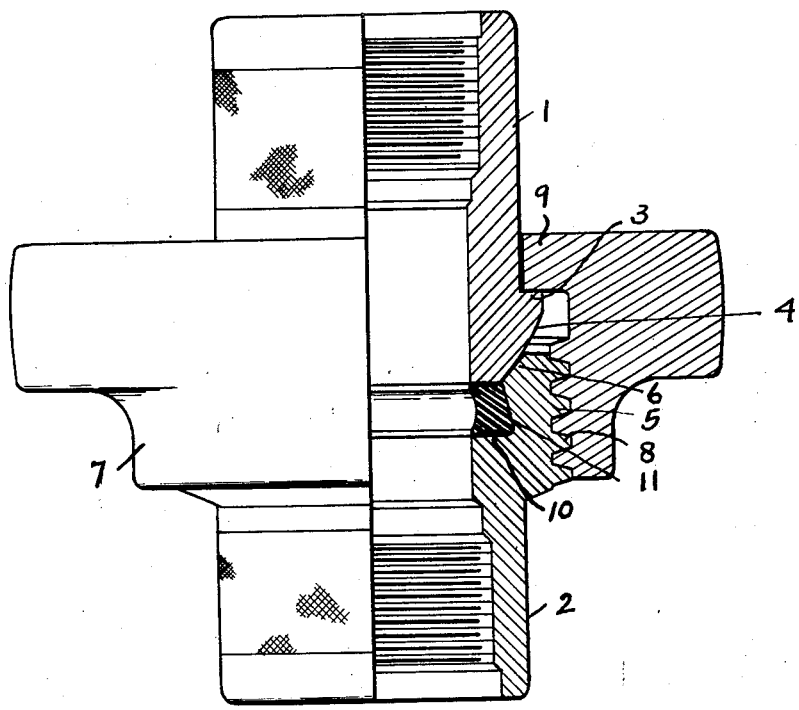
Figure 1 is a side view of the union, partly in section.
Figure 2:
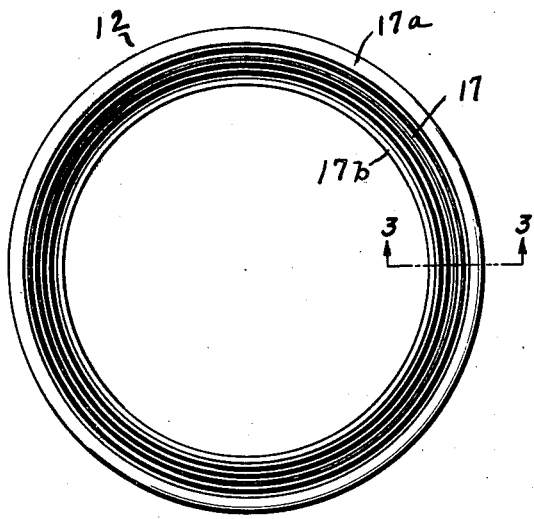
Figure 2 is a plan view of the gasket, or seal ring, as viewed from one side.

The inner end of the coupling member 1 is formed with an external annular shoulder 3 and, beyond said shoulder toward the inner end of said coupling member the coupling member has an external annular bearing surface 4 which is curved toward the inner end of said member all the way around, as clearly shown in Figure 1. The abutting end of the coupling member 2 is outwardly thickened and formed with coarse external threads 5 and has an inside outwardly flared plane annular face 6 which has a line contact all the way around the union with the curved face 4 so as to form a metal to metal joint when said coupling members are assembled.

There is a clamp nut 7 having coarse internal threads 8 adapted to intermesh with the threads 5 and also having an internal annular flange 9 which fits closely over the section 1 and which is engageable with the shoulder 3, when the threads are screwed home, to clamp the facing ends of the coupling members in abutting relation.

The inside diameter of the threads 8 is slightly larger than the outside diameter of the shoulder 3 so that the clamp nut 7 may be fitted over the coupling member 1 and the threads 8 screwed onto the threads 5.

The inner end of the coupling member 2 has an inside countersunk portion presenting a wall 10 which is approximately parallel with the opposing end of the coupling member 1 and also presenting an outer wall 11 which tapers, or converges, toward the inner end of the coupling member 2 at approximately a ten degree angle to the axis of the union. An annular inside groove is thus formed to receive a gasket which is designated generally by the numeral 12.

This gasket is formed of yieldable material such as neoprene or other similar material. Its outer face 13 is tapered, relative to its axis, so as to fit closely against the wall 11 of said groove. The end faces 14 and 15 converge outwardly, with respect to the axis of the gasket.

These faces 14 and 15 are provided with annular grooves thus forming annular ribs 16 and 17 which are concentric and which are, preferably, trapezoidal in cross-section, but may be of any selected shape.

Figure 3:
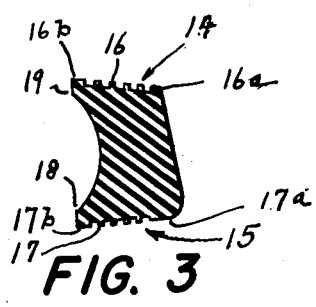
Figure 3 is a cross-sectional view of the gasket or seal ring, taken on the line 3—3 of Figure 2, but showing the gasket in reversed position from that shown in Figure 2.

It will be noted that the outer ribs 16a, 17a and the inner ribs 16b, 17b are slightly wider than the ribs between them, as is clearly shown in Figure 3. This construction has been found, in practice, to give a better sealing effect and in case a hard particle of sand or gravel or other hard substance finds its way between the ribbed face of the seal ring and the opposing end face of a coupling member only the rib in contact with such foreign substance will be distorted and the other ribs of the gasket, or seal ring, will still perform their normal sealing effect so that leakage will thereby be prevented.

Preferably, the inner side of the gasket is concaved from one end face to the other thus providing annular end ribs 18, 19 which extend inwardly. The inner side of the gasket is somewhat wider than the width of the groove in which it is designed to fit so that when the coupling member 1 is fitted into position against the facing end of the coupling member 2 and the clamp nut 7 is screwed home the gasket will conform its shape to the shape of said groove, as shown in Figure 1, and will be held in said groove under compression with the lip portions fitting tightly against the opposing sides of the groove.

The fluid flowing under pressure through the line will therefore tend to press the gasket more securely in place and will tend to spread the lips into close sealing relationship with the opposing sides of the groove. If the gasket were made to fit the groove and were not held therein under compression the fluid flowing through the line would unseat the gasket and displace it from the groove. Furthermore any gritty substance or hard particles that may find their way between the end faces of the gasket and the opposing sides of the groove will distort only the ribs in contact therewith leaving the other ribs free to seal against the opposing ends of the coupling members.

What I claim is:

1. A union which comprises, in combination, a first and a second coupling member, said first coupling member having at one end an outwardly curved annular external face and said second coupling member having an inwardly extending frusto-conical face adapted to contact the curved face of said first member in an annular line contact to form a metal-to-metal seal therewith, said members each having an internal plane face opposite one from the other, an annular resilient seal ring between said coupling members internally adjacent said faces forming said metal-to-metal seal and adapted to seat oppositely disposed faces thereof against said plane faces of said coupling members, said oppositely disposed faces of said seal ring having concentric grooves therein to thereby form concentric ribs on last said faces of substantially trapezoidal cross-section, said sealing ring having an internal annular face of sufficient area to permit fluid pressure to urge said ribs in sealing relationship with said plane faces.

2. The union of claim 1 wherein the innermost and the outermost ribs on each of said faces is of substantially greater width than any intermediate rib.

3. The union of claim 1 wherein said internal annular side is concave in cross-section from one of said oppositely disposed faces to the other in such a manner that an inwardly extending lip is formed with the innermost annular rib on said ring which lip is adapted to be urged in sealing relationship with the plane face of the adjacent coupling member by pressure exerted against said inner side.

DANIEL J. PARMESAN.

REFERENCES CITED

The following references are of record in the file of this patent:

UNITED STATES PATENTS

| Number | Name | Date |
|---|---|---|
| 126,624 | Coffee | May 14, 1872 |
| 798,441 | Nelson | Aug. 29, 1905 |
| 1,083,350 | Davis | Jan. 6, 1914 |
| 2,156,681 | Dewhirst | May 2, 1939 |
| 2,318,112 | Stillwagon | May 4, 1943 |